(12) United States Patent
Khotimsky et al.

(10) Patent No.: US 9,025,949 B2
(45) Date of Patent: May 5, 2015

(54) EQUALIZATION DELAY AGNOSTIC PROTECTION SWITCHING IN PROTECTED PASSIVE OPTICAL NETWORKS

(71) Applicants: ZTE Corporation, Shenzhen (CN); ZTE (USA) Inc., Morristown, NJ (US)

(72) Inventors: Denis Andreyevich Khotimsky, Westborough, MA (US); Dan Geng, Shanghai (CN); WeiLiang Zhang, Shanghai (CN)

(73) Assignees: ZTE Corporation, Shenzhen (CN); ZTE (USA) Inc., Morristown, NJ (US)

( * ) Notice: Subject to any disclaimer, the term of this patent is extended or adjusted under 35 U.S.C. 154(b) by 162 days.

(21) Appl. No.: 13/682,705

(22) Filed: Nov. 20, 2012

(65) Prior Publication Data

US 2013/0148956 A1 Jun. 13, 2013

Related U.S. Application Data

(60) Provisional application No. 61/569,209, filed on Dec. 9, 2011.

(51) Int. Cl.
*H04B 10/032* (2013.01)
*H04B 10/272* (2013.01)
*H04J 3/06* (2006.01)
*H04J 3/16* (2006.01)

(52) U.S. Cl.
CPC ............ *H04B 10/032* (2013.01); *H04B 10/272* (2013.01); *H04J 3/0682* (2013.01); *H04J 3/1694* (2013.01)

(58) Field of Classification Search
USPC ........................................ 398/1–5, 66–73, 8
See application file for complete search history.

(56) References Cited

U.S. PATENT DOCUMENTS

| | | |
|---|---|---|
| 2002/0171895 A1 | 11/2002 | Chang |
| 2010/0166419 A1 | 7/2010 | Elmoalem et al. |
| 2012/0082449 A1 | 4/2012 | Zheng |

FOREIGN PATENT DOCUMENTS

| | | | |
|---|---|---|---|
| CN | 101547044 A | 9/2009 | |
| CN | 101836379 A | 9/2010 | |
| CN | 101873166 | * 10/2010 | |
| CN | 101909222 A | 12/2010 | |
| EP | 2214344 A1 | * 8/2010 | .............. H04L 12/26 |
| EP | 2 249 499 A1 | 11/2010 | |
| EP | 2 426 856 A1 | 3/2012 | |
| WO | 2009/053708 A1 | 4/2009 | |
| WO | 2009/124484 A1 | 10/2009 | |
| WO | 2010/031326 A1 | 3/2010 | |
| WO | 2011/022883 A1 | 3/2011 | |
| WO | 2011/062528 A1 | 5/2011 | |

OTHER PUBLICATIONS

Search and Examination Report dated Apr. 23, 2013 for UK Patent Application No. 1221002.7, filed Nov. 22, 2012 (7 pages).

(Continued)

*Primary Examiner* — Leslie Pascal
(74) *Attorney, Agent, or Firm* — Perkins Coie LLP

(57) ABSTRACT

Systems, methods and apparatus for operating an optical network terminal (ONT) in a passive optical network include maintaining an operational state in the passive optical network, estimating an upstream channel, adjusting equalization delay and physical layer frame offset values and switching from a backup mode to a primary mode of operation upon detecting a failure condition.

19 Claims, 4 Drawing Sheets

(56) References Cited

OTHER PUBLICATIONS

Search and Examination Report dated Aug. 1, 2014 for UK Patent Application No. 1221002.7, filed Nov. 22, 2012 (5 pages).

Office Action dated Jan. 23, 2015 for Chinese Patent Application No. 201210478388.7, filed Nov. 22, 2012 (6 pages).

Search and Examination Report dated Feb. 2, 2015 for UK Patent Application No. 1421204.7, filed Nov. 28, 2014 (4 pages).

* cited by examiner

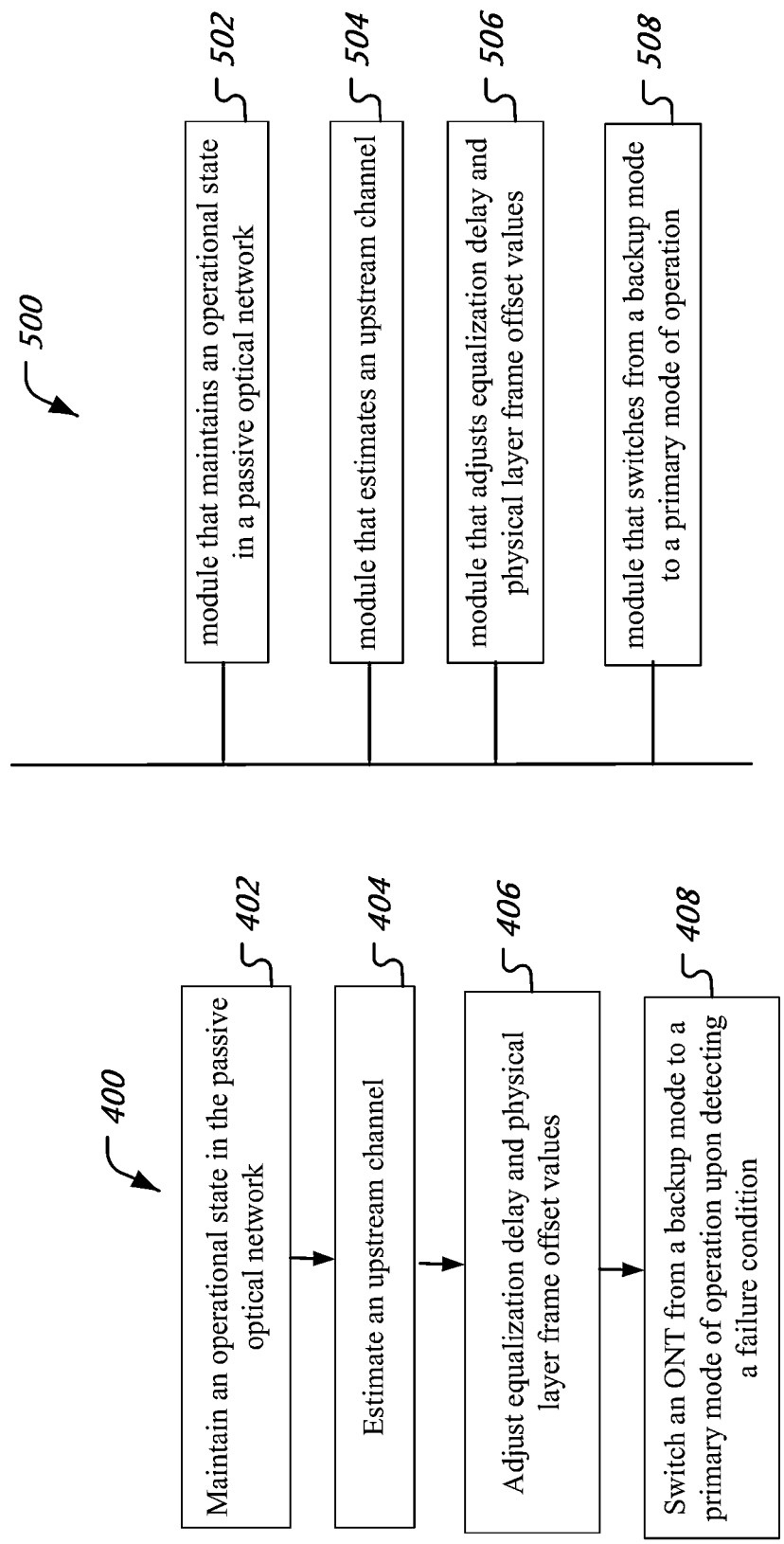

EQUALIZATION DELAY AGNOSTIC PROTECTION SWITCHING IN PROTECTED PASSIVE OPTICAL NETWORKS

CROSS REFERENCE TO RELATED APPLICATIONS

This patent application claims the benefit of U.S. Provisional Patent Application No. 61/569,209, entitled "EQUALIZATION DELAY AGNOSTIC PROTECTION SWITCHING IN PROTECTED PASSIVE OPTICAL NETWORKS," filed on Dec. 9, 2011. The entire contents of the before-mentioned patent applications are incorporated by reference as part of the disclosure of this application.

TECHNICAL FIELD

This patent document relates to systems, devices and techniques for operating a passive optical network.

BACKGROUND

A passive optical network (PON) is an optical network architecture based on point-to-multipoint (P2MP) topology in which a single optical fiber and multiple passive branching points are used to provide data communication services. A PON system can facilitate user access with a service provider communication facility to access telecommunication, information, entertainment, and other resources of the Internet. A PON system can include a central node, called an optical line terminal (OLT), which can be in connection with a single or multiple user nodes called optical network units (ONUs) via a passive optical distribution network (ODN). An OLT can be located at the access provider's communication facility (central office). An ONU can be located at or near the access user's premises.

In some deployments, to ensure no or minimum disruption of data services to user premises, a primary and a backup ONT may be used. In configurations where a primary and a backup ONTs are used, when a switchover is performed (e.g., upon failure of the primary ONT) from the primary ONT to the backup ONT, it is beneficial to switch from the primary ONT to the backup ONT with minimum disruption and overheads.

Techniques are needed for improved protection switching that is agnostic to overhead tasks such as estimation of equalization delays.

SUMMARY

This patent document provides, among others, systems, devices and techniques that are useful, in one aspect, for protection switching in protected passive optical networks (PONs) that are agnostic to (or independent of) equalization delay.

In one aspect, methods, apparatus and computer program products for operating an optical network terminal (ONT) in a passive optical network (PON) are disclosed. An ONT comprises a module for maintaining an operational state in a passive optical network, a module for estimating an upstream channel, a module for adjusting equalization delay and physical layer frame offset values and a module for switching from a backup mode to a primary mode of operation.

This and other aspects and their implementations are described in greater detail in the drawings, the description and the claims.

BRIEF DESCRIPTION OF DRAWINGS

FIG. 4 is a flow chart representation of a process of operating an ONT in a PON.

FIG. 5 is a block diagram representation of a portion of an ONT operable in a PON.

DETAILED DESCRIPTION

Figure 1:
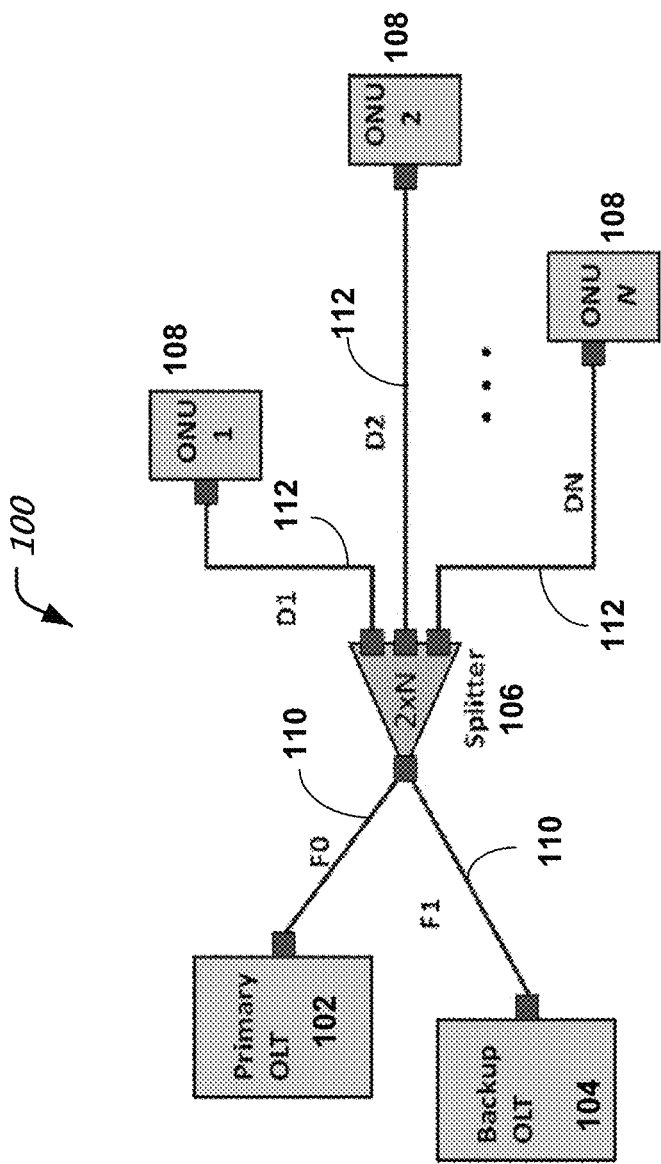
FIG. 1 is a block diagram of one example of a Type B protected PON access network.

This patent document discloses techniques for performing protection switching in protected passive optical networks (PONs) that are agnostic to (or independent of) equalization delay.

A PON system can use optical fiber to connect the user premises to the provider communication facility. The PON optical delivery/data network (ODN) can include a point-to-multipoint (P2MP) optical fiber infrastructure where passive branching points can be represented by optical splitters or other similar passive optical devices. These passive ODN equipments can be deployed in street cabinets, closets, underground utility holes, cable chambers, and other installations and require no electrical power and little maintenance. The PON ODN can be attached to the optical line terminal (OLT), also called optical network terminal (ONT) with a single strain of optical fiber.

The PON ODN can employ wavelength-division duplex or multiplexing methods to differentiate between downstream (from OLT to users) and upstream (from users to OLT) transmissions, i.e., downstream and upstream optical signals can be carried on different standardized wavelengths. Support of multiple users (ONUs) on the same ODN can be achieved using the methods of time-division multiplexing (TDM) in the downstream direction and time-division multiple access (TDMA) in the upstream direction.

Standard-based PON systems, such as Ethernet PON (EPON), Broadband PON (BPON), Gigabit PON (G-PON), 10 Gigabit/sec EPON (10G-PON), and X Gigabit/sec PON (XG-PON), can be distinguished based on one or more parameters, e.g., nominal transmission rates, optical layer parameters, or the link layer protocol and formats. These standard-based PON systems can share the TDMA method, which can also share associated vulnerabilities in the TDMA method.

In TDMA techniques, all ONUs attached to their given ODN infrastructure can perform upstream transmission on the same wavelength, which may result in ONU interference with each other, unless the ONUs follow a strict access procedure. For each standard-based PON system, the respective standard can define a multiple access protocol, including procedures and data structures, by which the OLT is able to assign the exact transmission time slots to the individual ONUs. This assignment attempts to prevent interference in upstream transmissions by different ONUs, whereas the appropriate guard time slots serve to accommodate by using the possible transmission time drift. The guard times also alleviate any potential interference caused due to different propagation delays through the optical medium due to differences in the lengths of fiber medium between each ONU and the OLT.

For example, it is well known that light in fiber travels about 30% slower than the speed of light in free space. Therefore, light travels at approximately 200,000 km/seconds in glass (optical fiber medium). In other words, light travels at approximately 0.2 km per microseconds in an optical fiber. Therefore, end-to-end propagation delay in a fiber optic network in which the maximum distance between a transmitter and a receiver is 40 km could be as high 200 microseconds. To put it differently, there could be ±100 microseconds delay between different transmitter nodes in such a network. For successfully mitigating differences between local clock values among various transmitter/receiver nodes in the network, the OLT should take into account such propagation delays.

Therefore, the physical configuration of transmitters/receivers in an optical network can impact the propagation delays in the network and therefore impact physical parameters of operation. Various standards organizations (e.g., IEEE and ITU) have defined certain protection architectures based on the arrangement of OLTs and ONUs. Some example architectures include: Type A, Type B, Type B dual homing, Type C, Type D, and so on.

In a Type B protected PON access network, a first stage splitter has 2 ports on the network-facing side, thus allowing "dual homing", or duplication of the OLT and the feeder fiber between the OLT and the network-facing port of the first stage splitter. Of the two OLTs (or OLT blades) connected to the given PON tree, one OLT is designated as a primary, while the other OLT is designated as a backup which is used to replace or backup the primary when the primary fails. When the primary OLT is operational, the backup OLT may not transmit downstream, but may remain powered up and listen to the upstream transmissions. In case of a failure of the primary OLT or the primary feeder cable, the backup OLT takes over control of the PON tree and resumes service to the subtending ONUs.

For a PON system to operate properly, the ONUs could be "ranged" with respect to the working OLT. That is, the logical distance between the OLT and each of the ONUs could be measured, and the corresponding equalization delay communicated to each individual ONU. Once the ONUs know and follow their assigned equalization delays, they appear at the same logical distance from the OLT, thus making their upstream transmissions aligned at a common upstream frame reference.

In some implementations, a backup OLT may reside in the same facility (e.g., a network operator's central office) as the primary OLT and therefore may have a same length of optical fiber between itself and the ONUs served. In other words, the propagation delays to/from the backup OLT may be (almost) identical to that from the primary OLT. In such cases, when a backup OLT takes over after the failure of the primary OLT, performance of the optical network may not suffer.

However, in general, a backup OLT may be located at a location different from the primary OLT or the length of fiber between the backup OLT and the served ONUs may be different from that of the primary OLT. Therefore, for seamless switchover, in some embodiments, for correct ranging of the ONUs with respect to the backup OLT in case of protection switching, the backup OLT has either to pre-range the ONUs before the switchover event, or to re-range the ONUs after the switchover event.

The present document provides techniques that, in a course of a switchover event, enable the ONUs remain essentially ranged. Therefore, in one aspect, a backup OLT may immediately resume regular operations relying on the ONU's knowledge of the equalization delays obtained via the primary path, while optionally executing a limited set of maintenance operations.

Under the ideal conditions (e.g., unique fixed downstream and upstream wavelengths, no dispersion, no temperature drift, fixed ONU processing time, zero serialization/deserialization delay), the set of Equalization Delays (EqDs) computed over the primary path (to/from the primary OLT) may remain valid for the backup path (to/from the backup OLT).

With reference to FIG. 1, an ODN 100 is depicted. In some configurations, the dual-homing ODN 100 includes two point-to-multipoint OLTs 102, 104 that have distinct trunk segments (feeder fibers 110) and share a distribution segment composed of a 2×N splitter 106 and a collection of drop fibers 112 respectively connected to ONUs 108. In such configurations, any multistage splitting may be represented by an equivalent drop fiber between the first-stage splitter and the ONU 108. OLTs 102, 104 are two OLTs (e.g., identically modules in some implementations) and each can be switched between a primary mode of operation and a backup mode of operation. In operation, one of OLTs 102, 104 (e.g., OLT 102) can be the primary OLT while the other OLT (e.g., OLT 104) can be the backup OLT. Therefore, the ODN 100 includes OLT (102 or 104), with the OLT including an operation state module that maintains an operational state in the ODN 100, an upstream estimation module that estimates an upstream channel, a delay adjustment module that adjusts equalization delay and physical layer frame offset values, and a backup module that switches from a backup mode to a primary mode of operation when the OLT initially operates as the backup OLT while another OLT initially operates as the primary OLT.

Let the effective fiber length of the primary feeder fiber be $F0$, the effective fiber length of the backup feeder fiber, $F1$. Let the effective fiber lengths of the drop fibers be $D1, \ldots, DN$. The effective fiber length of the splitter and other passive elements of the ODN is negligible. Let $P1, \ldots PN$ denote the ONU response times.

The ODN is constructed so that the following condition holds:

$$R\text{min} \leq \text{MAX}\{F0, F1\} + \text{MAX}i(Di) \leq R\text{max} \qquad \text{Equation (1).}$$

Here Rmin and Rmax are well-known ODN design parameters (in many cases, Rmin=0 km, Rmax=20 km).

Figure 2:
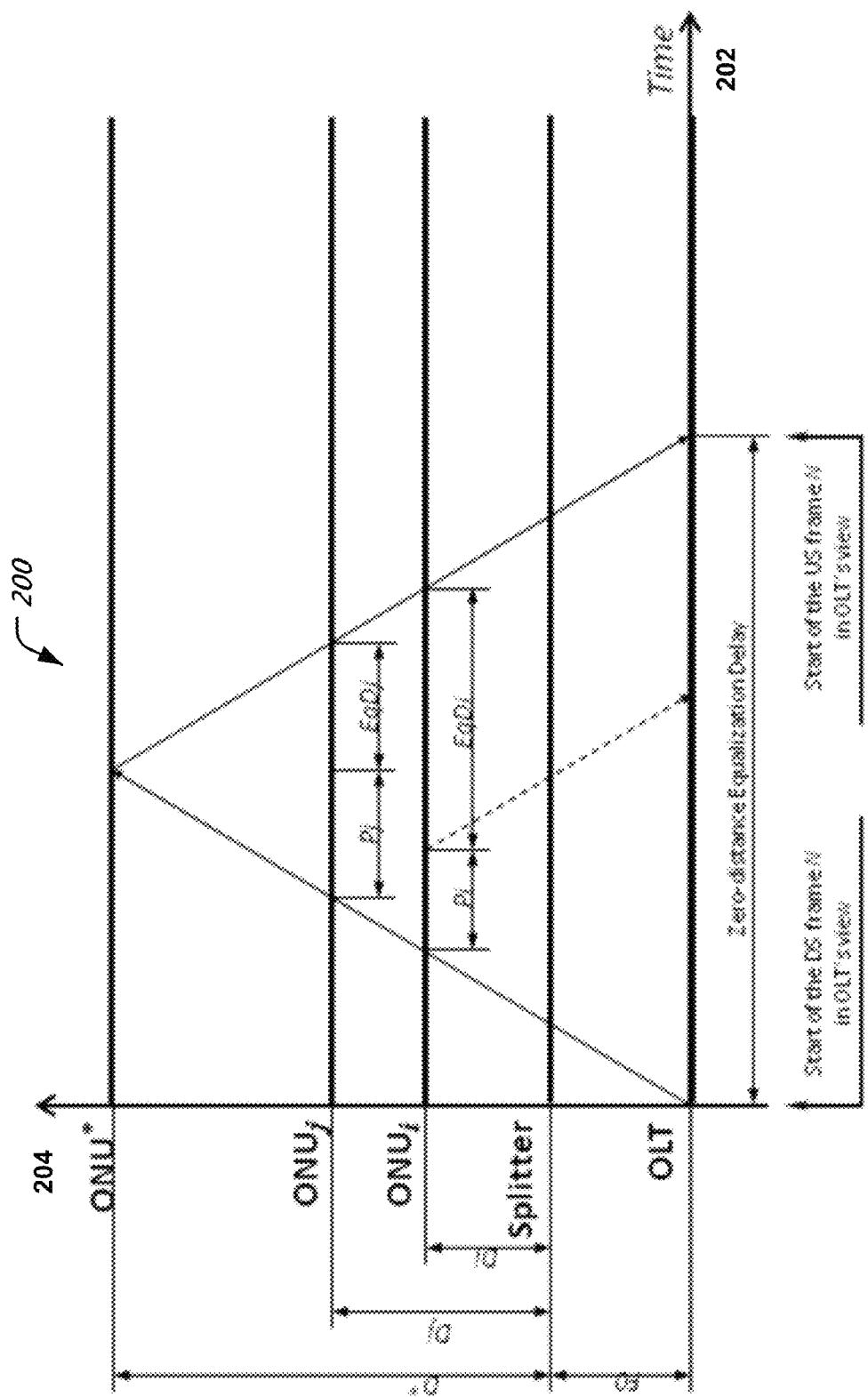
FIG. 2 is a graphical representation of a method of setting up equalization delays in ranging in a PON access network.

With reference to FIG. 2, a chart 200 is depicted, in which distance of various elements of PON are represented on the vertical axis 204 and time is represented on the horizontal axis 202, in the process of ranging, the OLT selects the upstream PHY frame offset with respect to the downstream PHY frame (this parameter is also known as zero-distance equalization delay), and measures the round-trip time for each ONU. The round-trip time is composed of the round-trip propagation delay and the ONU response time. Once the round-trip time is available, the OLT computes and communicates to the ONU the individual equalization delay, that is, the extra requisite delay that precisely aligns the ONU view on the start of an upstream PHY frame with the offset selected by the OLT. The adjusted round trip time (composed of the round-trip propagation delay, the ONU response time, AND equalizations delay) for all ONUs is equal to the selected PHY frame offset.

The selected upstream PHY frame offset, Tmax, should at least be equal to the largest round-trip time among the ONUs in the system, and in practice does not have to exceed the upper bound based on the network design parameters:

$$T\text{max} \leq R\text{max}(n1+n2)/c + P\text{max} \qquad \text{Equation (2)}$$

Here n1 and n2 are refractive indices for the upstream and downstream wavelengths, c is the speed of light, and Pmax is the maximum ONU response time established by the standard.

Selecting of Tmax is equivalent to choosing the drop fiber length, D*, of a hypothetical remotest ONU with zero response time:

$$Tmax=(F0+D^*)(n1+n2)/c \quad \text{Equation (3)}$$

Once the round-trip time for a given ONU is measured, the equalization delay can be found by subtracting the round-trip time from the upstream PHY offset:

$$EqDi=Tmax-[(F0+Di)(n1+n2)/c+Pi] \quad \text{Equation (4)}$$

After all the ONUs in the system are ranged, the OLT may schedule upstream transmissions within each PHY frame by relating them to the common upstream PHY frame reference in the bandwidth map.

Figure 3:
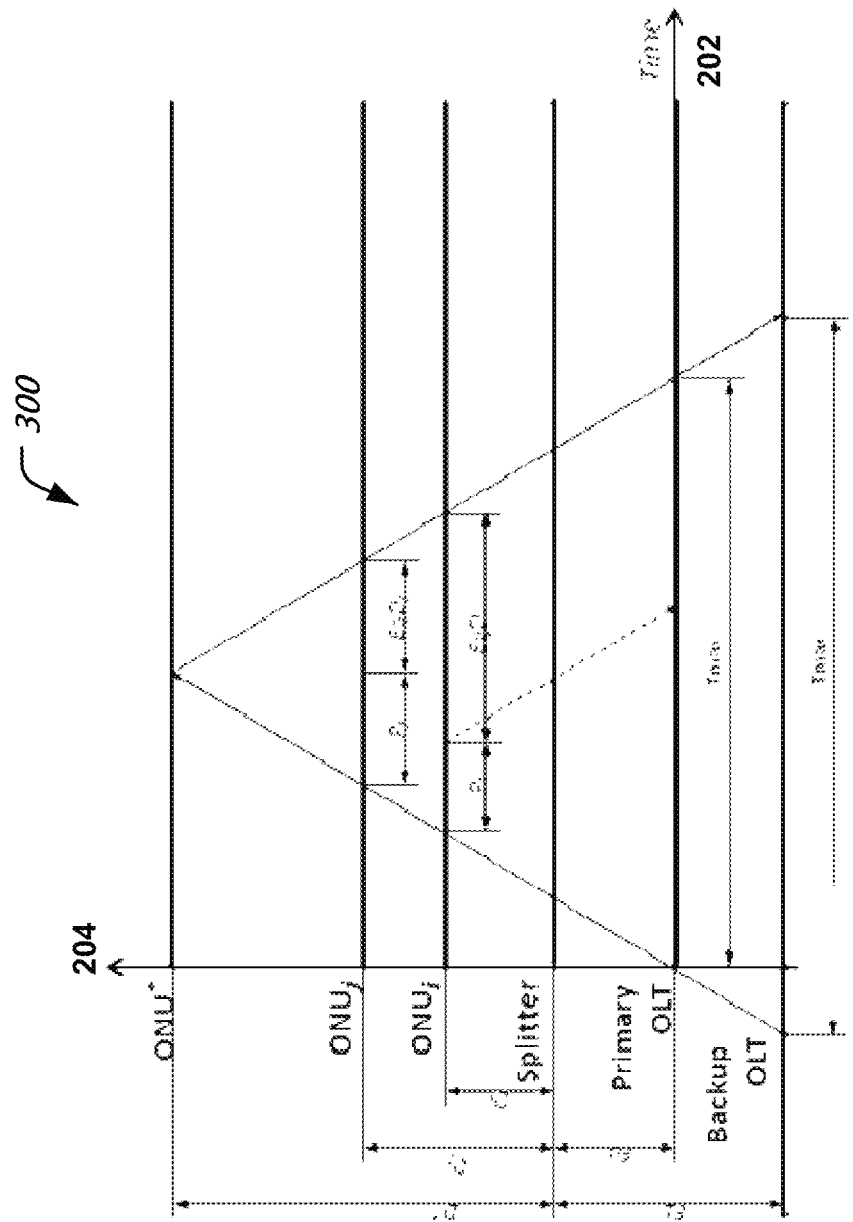
FIG. 3 is a graphical representation of backup optical line terminal reusing the primary ranging information.

With reference to FIG. 3, a chart 300 is shown illustrating how a backup OLT can reuse ranging information of a primary OLT. Consider now a dual-homed system with primary OLT having the feeder fiber length F0 and backup OLT with feeder fiber length F1. Under the ideal conditions (n1, n2, Pi remain constant in the switchover), the adjusted round-trip times for all ONUs remain identically equal to each other, albeit the upstream PHY frame offset changes.

$$Tmax'=EqDi+[(F1+Di)(n1+n2)/c+Pi;] \quad \text{Equation (5)}$$

$$Tmax'-Tmax=(F1-F0)(n1+n2)/c] \quad \text{Equation (6)}$$

Thus under the ideal conditions, the backup OLT may reuse the Equalization delays computed and communicated to the ONUs by the primary OLT, without performing ranging on its own and without even knowing the values of the primary EqDs. The backup OLT may construct bandwidth maps in a usual fashion by relating the upstream transmissions to the common upstream PHY frame reference. The backup OLT, however, should be ready to detect the upstream burst at an arbitrary time as the upstream PHY frame offset is not initially known after the switchover.

Referring to Equation (6), in some embodiments, the difference between the upstream PHY frame offset used by the backup OLT and that used by the primary OLT may only be a function of refractive index of their respective fiber drops and the difference in lengths of the fiber drops to the splitter. In other words, Tmax' value used by the backup OLT may be adjusted from the Tmax value used by the primary OLT, without the backup OLT needing additional information about fiber drop lengths to the ONUs.

In a practical network, if the ONUs retain the primary Equalization delays, the adjusted round-trip times observed by the backup OLT will no longer be identical. ONUs are transmitting on generally different wavelengths with different refractive indices, and the response times may change due to the serializer/deserializer phase randomization. The aggregate relative drift caused by these effects, however, can be bounded and will not exceed a few tens of bit times. The backup OLT can mitigate the drift by providing additional guard time between the upstream bursts in the bandwidth maps. Furthermore, depending on the mechanisms offered by the TC layer of a particular PON system, the backup OLT may reacquire the ranging information without service interruptions associated with opening of the quiet windows.

In some configurations, prior to switchover, the backup OLT obtains the ODN design parameters and the value of the primary upstream PHY offset, Tmax, via an off-line management channel.

In some configurations, upon the switchover, the backup OLT proceeds as follows:

The backup OLT ensures that the subtending ONUs are in the Operation state O5. In the O5 operational state, an ONU is operating normally and following the transmission schedule (grants) communicated to the ONU from the OLT. In XG-PON networks, this is achieved by virtue of well-formed downstream transmission. In G-PON, an individual directed POPUP message may be used, unless a broadcast modified POPUP message can be used to bring the ONUs in the POPUP state directly into the O5 state.

The backup OLT schedules the upstream transmissions by forming a bandwidth map with extended guard times between the individual bursts relating them to yet unknown upstream PHY frame reference.

The backup OLT detects the individual upstream transmissions and observes the adjusted round-trip times of the subtending ONUs. The adjusted round trip times may typically form a distribution with bounded support.

The backup OLT selects the largest observed round-trip time as an interim upstream PHY frame offset.

The backup OLT issues individual relative equalization delay adjustments to align the ONUs at the selected interim upstream PHY frame offset. This is done with an available Ranging_Time message in XG-PON and requires a modification of a Ranging-Time message in G-PON. Alternatively, this can be done with providing a modified physical layer operations, administration and maintenance (PLOAM) messaging channel functionality to learn the effective equalization delay and using the available Ranging_Time message with absolute semantics.

The backup OLT may adjust the upstream PHY frame offset at the desired value by issuing a broadcast relative equalization delay adjustment. This is with an available Ranging_Time message in XG-PON and requires a modification of a Ranging-Time message in G-PON.

Next. the backup OLT restores the normal guard times in the bandwidth maps.

In the subsequent operation, the backup OLT, which has become the serving OLT, conducts service as usual, including discovery and admission of the newly activated ONUs for which it opens a quiet window and performs ranging with equalization delay calculation.

FIG. 4 depicts a flow chart 400 of an example process of operating an ONT in a PON to provide the primary and backup operations. At 402, an operational state of is maintained in the PON. For example, as discussed above, the backup ONT may maintain various operational parameters of the PON. At 404, an upstream channel is estimated. As previously discussed, the estimation of upstream channel may include measuring round trip delay times of all ONUs subtended by the backup OLT. At 406, equalization delay and physical layer frame offset values are adjusted. At 408, an ONT is switched from a backup mode to a primary mode of operation upon detecting a failure condition (e.g., failover due to a primary ONT stoppage).

FIG. 5 is a block diagram representation of an ONT 500 that provides both the backup and primary modes of operation and the switching between the two modes. The module 502 is for maintaining an operational state in a passive optical network. The module 504 is for estimating an upstream channel. The module 506 is for adjusting equalization delay and physical layer frame offset values. The module 508 is for switching from a backup mode to a primary mode of operation.

It will be appreciated that several techniques are disclosed for a backup OLT to take over as the primary OLT after the current primary OLT fails. In some disclosed embodiments, the backup OLT can perform equalization delay agnostic protection switching. It will also be appreciated that the backup OLT may be able to adjust upstream PHY frame offset parameter by initially using network side parameters known a priori, e.g., Equation (6), and then by performing measurements while serving as the primary OLT after the switchover.

The disclosed and other embodiments, modules and the functional operations described in this document (e.g., operation state module, upstream estimation module, delay adjustment module, backup module, round-trip delay module, PHY offset value selector module, delay adjustment issuer module, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. An optical line terminal (OLT) apparatus, at least partially implemented in hardware, to take over a primary mode of operation upon failure of a primary OLT in a passive optical network, comprising:
    an operation state module that maintains an operational state of optical network units (ONUs) in the passive optical network;
    an upstream estimation module that reuses ranging information of the primary OLT and selects an interim upstream PHY frame offset for an upstream channel, wherein the selected interim upstream PHY frame offset is adjusted from an upstream PHY frame offset used by the primary OLT using a difference between fiber lengths of a primary feeder fiber of the primary OLT and a backup feeder fiber of the OLT;
    a backup module that switches from a backup mode of operation to the primary mode of operation and uses the interim upstream PHY frame offset; and
    a delay adjustment module that adjusts, when the maintained operational state indicates that ONUs are following transmission schedule grants communicated by the OLT, equalization delay of each ONU subtended by the OLT by issuing individual relative equalization delay adjustments to each ONU to align all the ONUs subtended by the OLT at the selected interim upstream PHY frame offset.

2. The OLT apparatus of claim 1, wherein the operation state module is configured to maintain the operational state of the passive optical network during the operation of the ONT in the backup mode such that all optical network units (ONUs) subtended by the OLT are in a normal operational mode.

3. The OLT apparatus of claim 2, wherein the operation state module is configured to transmit, for an ONU not in the normal operational state, a downstream message to bring the ONU to the normal operational state.

4. The OLT apparatus of claim 1, wherein the upstream estimation module includes:
a round-trip delay module that measures round trip times for all optical network units (ONUs) subtended by the ONT.

5. The OLT apparatus of claim 1, further includes:
a PHY offset value selector module that selects an interim upstream PHY frame offset value at which the ONUs align.

6. A method of operating an optical line terminal (OLT) to switch from a backup mode of operation to a primary mode of operation in a passive optical network, the method comprising:
maintaining, by the OLT, an operational state of optical network units (ONUs) in the passive optical network;
estimating an upstream channel by reusing ranging information of the primary OLT and selecting an interim upstream PHY frame offset for an upstream channel, wherein the selected interim upstream PHY frame offset is adjusted from an upstream PHY frame offset used by the primary OLT using a difference between fiber lengths of a primary feeder fiber of the primary OLT and a backup feeder fiber of the OLT;
switching, upon detecting a failure condition of the primary OLT, the OLT from a backup mode of operation to a primary mode of operation by using the interim upstream PHY frame offset; and
adjusting, when the maintained operational state indicates that ONUs are following scheduling grants communicated by the OLT, equalization delay of each ONU subtended by the OLT by issuing individual relative equalization delay adjustments to each ONU to align all the ONUs subtended by the OLT at the selected interim upstream PHY frame offset.

7. The method of claim 6, wherein the maintaining the operational state includes maintaining the operational state of the passive optical network during the operation of the ONT in the backup mode such that all optical network units (ONUs) subtended by the OLT are in a normal operational mode.

8. The method of claim 7, wherein the maintaining the operational state includes transmitting, for an ONU not in the normal operational state, a downstream message to bring the ONU to the normal operational state.

9. The method of claim 6, wherein the estimating the upstream channel includes:
measuring round trip times for all optical network units (ONUs) subtended by the ONT.

10. A method of switching an optical line terminal (OLT) apparatus from a backup mode to a serving mode upon detecting a failure condition of a primary OLT, the method comprising:

operating, prior to the switchover, the OLT to monitor operational parameters of an optical data network in which the OLT is operating; and
operating, after the switchover, the OLT to:
ensure that optical network units (ONUs) served by the OLT are in a common operational state;
schedule upstream transmissions from the ONUs by forming a bandwidth map with extended guard times;
detect upstream transmissions from the ONUs and observe round-trip times of the ONUs;
select an interim offset value for PHY frames;
issue individual equalization delay adjustments for the ONUs; and
restore, after issuing the individual equalization delay adjustments, normal guard time in the bandwidth map.

11. The method recited in claim 10, further including:
operating, after the switchover, the OLT to adjust the interim offset value by issuing a broadcast relative equalization delay adjustment.

12. The method of claim 10, wherein the monitored operational parameters of the optical data network include a value of upstream PHY offset.

13. The method of claim 10, wherein the monitored operational parameters of the optical data network is obtained via an off-line management channel.

14. The method of claim 10, wherein the selected interim offset value is equal to a largest observed round-trip time.

15. The method of claim 10, wherein the individual equalization delay adjustments are issued using a physical layer operations, administration and maintenance message.

16. An optical communications system comprising a primary optical line terminal (OLT) and a backup OLT located on a network-side and a plurality of optical network units (ONUs) located near customer premises, wherein the backup OLT is configured to operate in:
a first mode in which the backup OLT obtains operational parameters of the optical communications system including upstream PHY offset used by the primary OLT;
a second mode in which the backup OLT takes over functions of the primary OLT and controls upstream transmissions from the ONUs using an extended guard time between upstream bursts; and
a third mode in which the backup OLT controls upstream transmissions from the ONUs using an updated guard time based on an observed largest round-trip delay time from the ONUs during the second mode.

17. The optical communication system of claim 16, wherein, in the first mode, the backup OLT obtains the operational parameters via an off-line management channel.

18. The optical communication system of claim 16, further including a splitter that couples the primary OLT and the backup OLT with the plurality of ONUs.

19. The optical communication system of claim 18, wherein a first length of fiber trunk segment between the primary OLT and the between splitter is different from a second length of fiber trunk segment between the backup OLT and the splitter.

* * * * *